(12) United States Patent
Dempsey et al.

(10) Patent No.: US 6,241,253 B1
(45) Date of Patent: Jun. 5, 2001

(54) EDGE COATED SOFT GASKET

(75) Inventors: Dennis M. Dempsey, Lancaster; Christopher L. Morris, Oxford, both of PA (US)

(73) Assignee: Interface Solutions, Inc., Lancaster, PA (US)

(*) Notice: Subject to any disclaimer, the term of this patent is extended or adjusted under 35 U.S.C. 154(b) by 0 days.

(21) Appl. No.: 09/093,084

(22) Filed: Jun. 8, 1998

(51) Int. Cl.$^7$ .................................................. F16J 15/10
(52) U.S. Cl. ........................ 277/596; 277/627; 277/650
(58) Field of Search ................................. 277/592, 596, 277/600, 612, 627, 650, 652, FOR 248

(56) References Cited

U.S. PATENT DOCUMENTS

| | | | |
|---|---|---|---|
| 2,681,241 | * | 6/1954 | Aukers . |
| 3,355,181 | * | 11/1967 | Olsen . |
| 3,661,401 | | 5/1972 | Farnam . |
| 4,272,085 | * | 6/1981 | Fujikawa et al. . |
| 4,499,135 | | 2/1985 | Mitchell et al. ............. 428/137 |
| 4,548,165 | * | 10/1985 | Vorobiev et al. . |
| 4,600,201 | | 7/1986 | Lonne et al. . |
| 4,635,949 | * | 1/1987 | Lucas et al. . |
| 4,691,928 | * | 9/1987 | Abele . |
| 4,741,965 | | 5/1988 | Zerfass et al. ............. 428/447 |
| 4,746,130 | * | 5/1988 | Abele . |
| 5,082,297 | | 1/1992 | Flasher . |
| 5,240,766 | | 8/1993 | Foster ..................... 428/280 |
| 5,518,257 | * | 5/1996 | Breaker . |
| 5,536,565 | | 7/1996 | Halout et al. ............. 428/283 |
| 5,540,566 | * | 7/1996 | Ishizaki et al. . |
| 5,700,017 | * | 12/1997 | Tensor . |

FOREIGN PATENT DOCUMENTS

| | | | |
|---|---|---|---|
| 28 31 217 | * | 1/1980 | (DE) . |
| 37 11 664 | * | 10/1988 | (DE) . |
| 37 19 189 | * | 12/1988 | (DE) . |
| 39 03 918 | * | 8/1990 | (DE) . |
| 487 369 | * | 5/1992 | (EP) . |
| 499 551 | * | 8/1992 | (EP) . |

* cited by examiner

*Primary Examiner*—Anthony Knight
*Assistant Examiner*—John L. Beres
(74) *Attorney, Agent, or Firm*—Womble Carlyle Sandridge & Rice, PLLC (57) ABSTRACT

A soft gasket material having two opposed facial surfaces and an edge that is substantially perpendicular to those surfaces has a coating on the edge. The coating has a thickness length B which is a distance extending directly from the edge at its center point to the coat's outer surface. The coating further covers the edge from side to side and extends past at least one corner of the edge in a protruding length A which is an amount that is effective to form a barrier against the passage of fluids onto the face of the gasket. In coatings where the protruding length A is not supported by the gasket face, the ratio of protruding length A: thickness length B must be at least about 0.8, protruding length A must be a minimum of at least about 4 mils, and thickness length B must be a minimum of at least about 3 mils. In coatings where the protruding length A is supported by the gasket face (a distance C), the ratio of protruding length A: thickness length B can be at least about 0.6, protruding length A can be a minimum of at least about 3 mils, and thickness length B can be a minimum of at least about 2 mils.

13 Claims, 6 Drawing Sheets

EDGE COATED SOFT GASKET

BACKGROUND OF THE INVENTION

Field of the Invention

Gaskets having an edge coating on at least one vertical edge (lying between the two faces of the gasket) of the gasket is provided. The edge coating provides a much greater sealing ability to soft gasket material. The present invention offers gasket edge coatings which are optimized and thus improved. Edge coatings can be put on gaskets to intentionally obtain a total seal against fluids.

The sealing ability of soft gasket materials is extremely important, and has been the focus of considerable development effort. The edge coating is one feature which has recently been developed to provide a greater sealing ability to the gasket. Advantageously, the edge coating allows the remainder of the gasket to optionally and preferably have no coating. When the gasket is uncoated, or has only a release coating, the compression failure resistance of the gasket is preserved.

Many features have been used with gaskets in order to provide good or better sealing ability, particularly against fluids.

Beading on the face of the gasket is known. Such beading is a raised area put on the face. Beading, however, does not extend past the edge, and does not extend onto the edge. Although the beading is used to enhance sealing ability, the beading fails to consistently provide a perfect seal.

One gasket material which is offered to provide a good seal at high temperatures is described in U.S. Pat. No. 5,240,766. This reference describes a soft gasket sheet material having fiber, filler and binder. According to the reference, the filler component provides a desirable sealability.

Another reference which describes gasket sheet materials that provides good sealing properties is U.S. Pat. No. 5,437,767. This reference describes a gasket sheet material with fiber and filler. The filler component must include a gel-forming mineral. This filler gives the gasket good sealing properties, especially against polar liquids.

Yet another type of gasket reference relies on coatings to provide or enhance the sealing ability of the gasket. For example, U.S. Pat. No. 4,499,135 impregnates the gasket with a silicone resin to improve resistance to water/antifreeze mixtures; U.S. Pat. No. 3,661,401 requires that the gasketing is given a coating which covers the entire gasket, vertical edges included; and U.S. Pat. No. 4,600,201 impregnates the gasket mat with a polymerizable liquid impregnating agent and applying to at least one part of at least one mat face, a coating containing a polymerizable polymer material. Gasketing which is completely coated, however, in general will perform poorly at higher pressures, which severely limits the field of use of the gaskets.

It has been discovered that by edge-coating the vertical edges of gaskets, especially the vertical edges around an aperture, and optionally the outer edge of the gasket, the resulting gasket will give a good and even a total seal against fluids. The present invention, however, describes how these edge coatings can be optimized to provide better sealing ability and to more consistently provide total seals.

Accordingly, it is an object of the present invention to describe an optimized edge coating for the vertical edges of a soft gasket material.

SUMMARY OF THE INVENTION

A soft gasket material comprises two opposed surfaces (faces), and at least one edge which is substantially perpendicular to these surfaces; the edge (referred to herein as the perpendicular edge of the gasket) further has a coat thereon which extends directly from the edge at its center point and going to the coat's outer surface (referred to herein as "thickness length B"). The center point of the edge is the middle of the edge length. The edge length is the shortest distance on the edge going between the two faces in a straight line.

The coat is also required to have a width in the direction parallel to the edge such that the coat covers the edge from side to side and extends past at least one corner of the edge in an amount effective to form a barrier against the passage of fluids onto the face of the gasket. (The corner being where the edge meets one of the opposed surfaces, i.e. the end of the edge). The length or distance that the coating extends past the corner of the edge (or the end of the edge) in a direction perpendicular to the opposed surfaces is referred to herein as a "lip", the "extended coating", "extended coating", the "protruding length", the "protruding distance" and is also called "protruding length A". The "coat thickness" or "thickness length B" refers to the length or distance in the coating which extends directly from the gasket edge at its middle point between the opposed surfaces and ending at the outer surface of the coat.

When the coating on the edge is formed so that the lip or the extended coating barrier sits partially on the gasket face the gasket provides support to the protruding lip (or extended coating). In such a case the ratio of A:B must be a minimum of about 0.6 and preferably it is a minimum of about 0.9. In such a case the thickness length B is a distance of at least about 2 mils. When, however, the protruding length A is not supported by the face, the thickness length B is a minimum length of about 3 mils and the ratio of A:B is a minimum of about 0.8 and preferably is a minimum of about 1.25. The thickness length B provides a base for the coating which forms protruding length A.

When the coated edge is around an aperture in the gasket sheet material, the coating forms a "primary seal" against the passage of fluids going from the aperture and across the face of the gasket. When the coated edge is around the outside or the perimeter of the gasket, the coating forms a secondary seal against fluids. The coated edge can be either around an aperture or it can be around the outside of the gasket.

DESCRIPTION OF THE DRAWINGS

In FIGS. 1–4 there is a protruding length A on each side of the gasket and they are equal. If the coating does not extend equally beyond each face, then the distances can be separately and arbitrarily designated as "protruding length $A_1$" and "protruding length $A_2$".

Protruding length A should be present on each side of the gasket where face 1 or 7 meets edge (2). The coating also extends a distance (4) out from the surface of the edge (2) (measured at a point on the edge which is equidistant from each face). Distance (4), herein referred to as thickness length B, is the distance (on FIG. 1) from the center of edge (2) directly to the outer surface of the coating (5). In FIG. 1 the ratio of the protruding length A to thickness length B should be at least about 0.8, and the thickness length B is at least about 3 mils.

FIG. 2 shows a gasket sheet having edge (2) and opposed faces (1 and 7). The gasket sheet edge (2) has a coating (9) which is an edge seal. From the figure it can be appreciated that each face has a plane, and the edge seal coating extends beyond the plane of each face in a perpendicular direction. The coating (9) extends a distance (3), herein referred to as protruding length A. The coating here extends past the corner and the plane of each face, since the corner is in the plane of the face. The coating also extends a distance (4) herein referred to as thickness length B which is the distance from the center of edge (2) directly to the outer surface of the coating (9). Coating (9) extends out onto faces 1 and 7 in optional features (6) and (8) but the extended coating barrier does not rest on the gasket face, so the ratio of length A:length B must be at least 0.8.

FIG. 3 shows a gasket sheet having edge (2) and opposed faces (1 and 7). The gasket sheet edge (2) has a coating (10) which is an edge seal. The edge seal coating extends beyond the plane of each face in a direction which is perpendicular to the face (shown in FIG. 3 as distance (3). This protruding length A of the coating rests in part (along distance C) on the face of the gasket. The coating also extends a distance (4) herein referred to as thickness length B which is the distance from the center of edge (2) directly to the outer surface of the coating (10). The edge coating overlaps the end of the edge and, overlapping the corner, extends onto a face of the gasket. Thickness length B must be at least about 2 mils and the ratio of length A: length B must be at least about 0.6. Since part of the edge coating is supported (along distance C) by the face of the gasket the ratio of length A:length B can be lower than the edge coatings of FIGS. 1, 2, and 4. Permissively, the coating can extend onto one or both gasket faces. Such coatings form a barrier against the passage of fluids, and do not form a level coating over the gasket.

FIG. 5 shows a gasket sheet having a coated edge. The coating extends beyond the plane of each face in a perpendicular direction. An extended coating is thus present at each side of the coated edge; arbitrarily, the figure shows a protruding length $A_1$ at the upper face and a protruding length $A_2$ at the other (lower) face. Neither of the protruding lengths of coating rest on either of the gasket faces.

FIG. 6 shows a gasket sheet having a coated edge. The coating extends beyond the plane of each face in a perpendicular direction and forms protruding length $A_1$ which extends perpendicular to the upper face, and protruding length $A_2$ which extends perpendicular to the lower face; both length $A_1$ and $A_2$ rests in part on the face of the gasket. It can also be noted that the coating covers the entire edge of the gasket and extends out onto the face of the gasket.

FIG. 7 shows a gasket sheet having a coated edge. The coating extends beyond the plane of each face in a perpendicular direction and forms protruding length $A_1$ going beyond the upper face, and protruding length $A_2$ which extends beyond the lower face. Each of the protruding lengths ($A_1$ and $A_2$) rest in part on one of the faces of the gasket. It can also be noted that the coating on the gasket edge covers the entire edge of the gasket and extends out onto both of the faces of the gasket.

FIG. 8 shows a gasket material having a coated edge according to the present invention. The coating (10) extends beyond the plane of each face in a perpendicular direction, forming a protruding length $A_1$ which, as shown herein, extends beyond the upper face, and a protruding length $A_2$, which extends beyond the lower face. The coating additionally extends a distance (4) out from the surface of the edge (2). As shown herein, the coating overlaps onto the upper face (1) but does not overlap onto the lower face (7).

The faces or facial surfaces (1) (the "upper" face) and (7) (the "lower" face) of the gaskets in the above figures each have a facial plane. The facial planes are substantially parallel to each other. In FIGS. 1–4 the facial plane goes through the corner between the face and the edge (2) which is substantially perpendicular to each. The edge surface is around an aperture and is given the coating which extends or protrudes beyond the facial plane.

DETAILED DESCRIPTION

Figure 1:
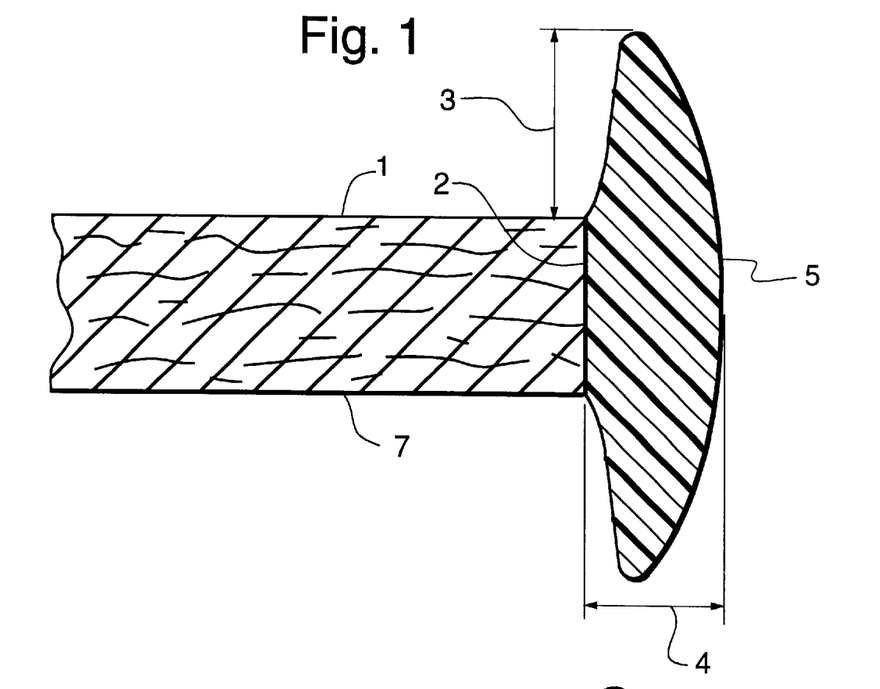
FIG. 1 shows a gasket sheet having edge (2) and opposed faces (1 and 7). The gasket sheet edge (2) has a coating (5) which is an edge seal. The edge seal coating extends beyond the plane of each face in a direction perpendicular to the face. The coating extends a distance (3) herein referred to as protruding length A which is at least about 2.4 mils past the face. In the figure only one distance (3) is labeled since the distance is the same on each side of the gasket.
Figure 2:
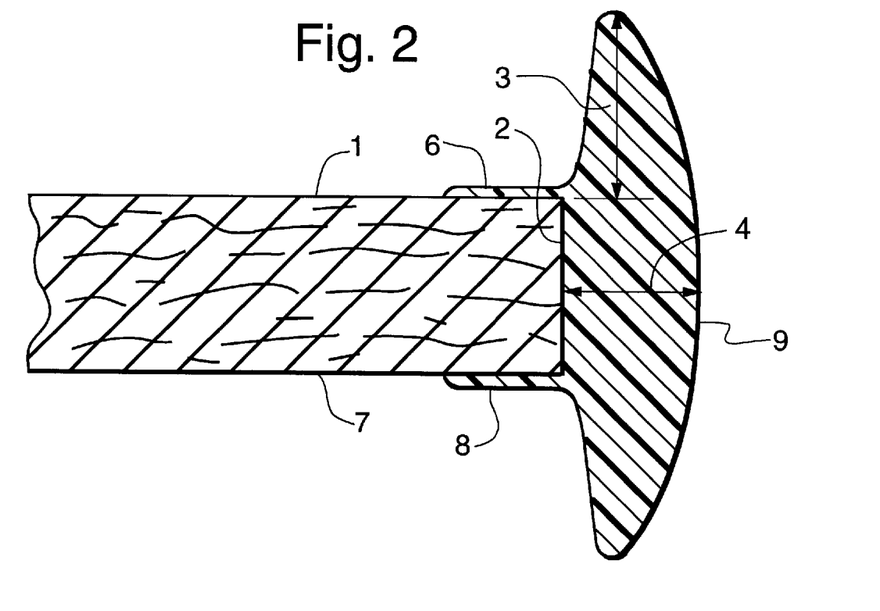
Figure 3:
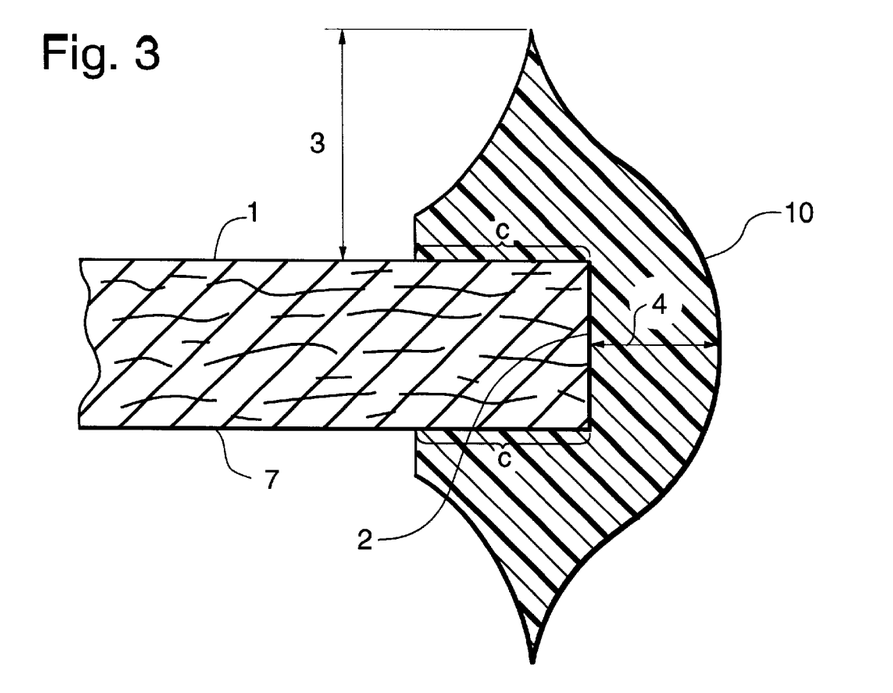
Figure 6:
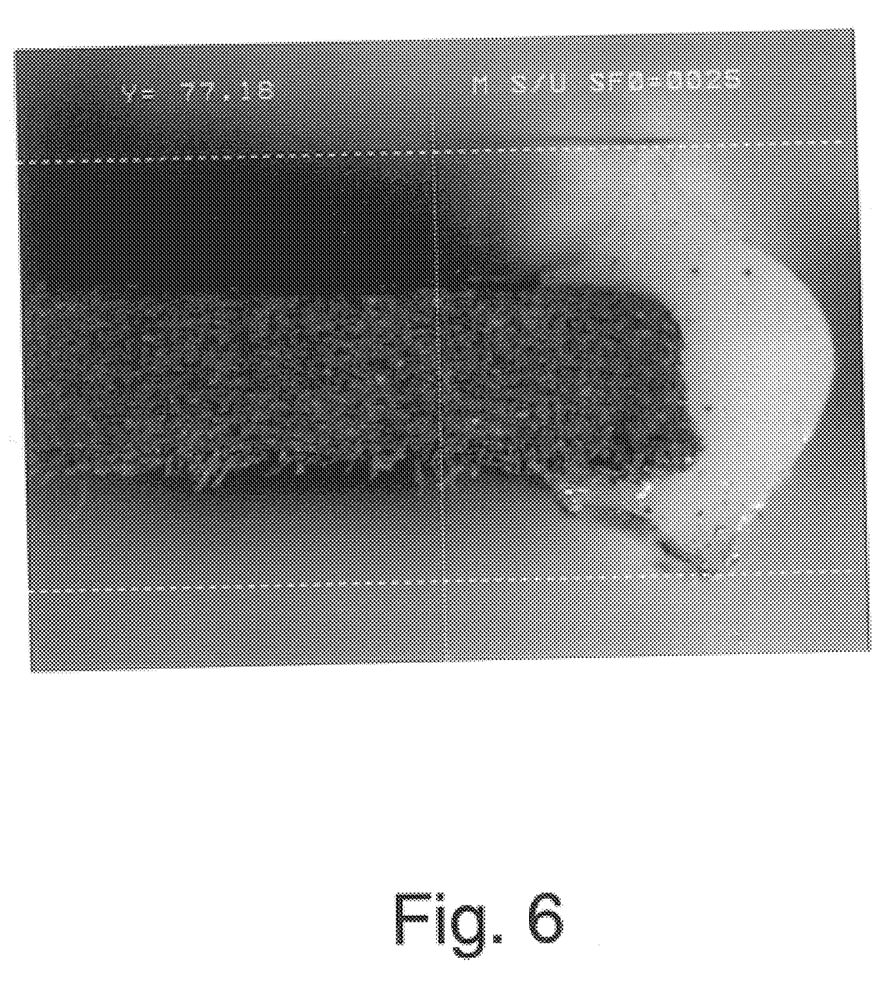
Figure 7:
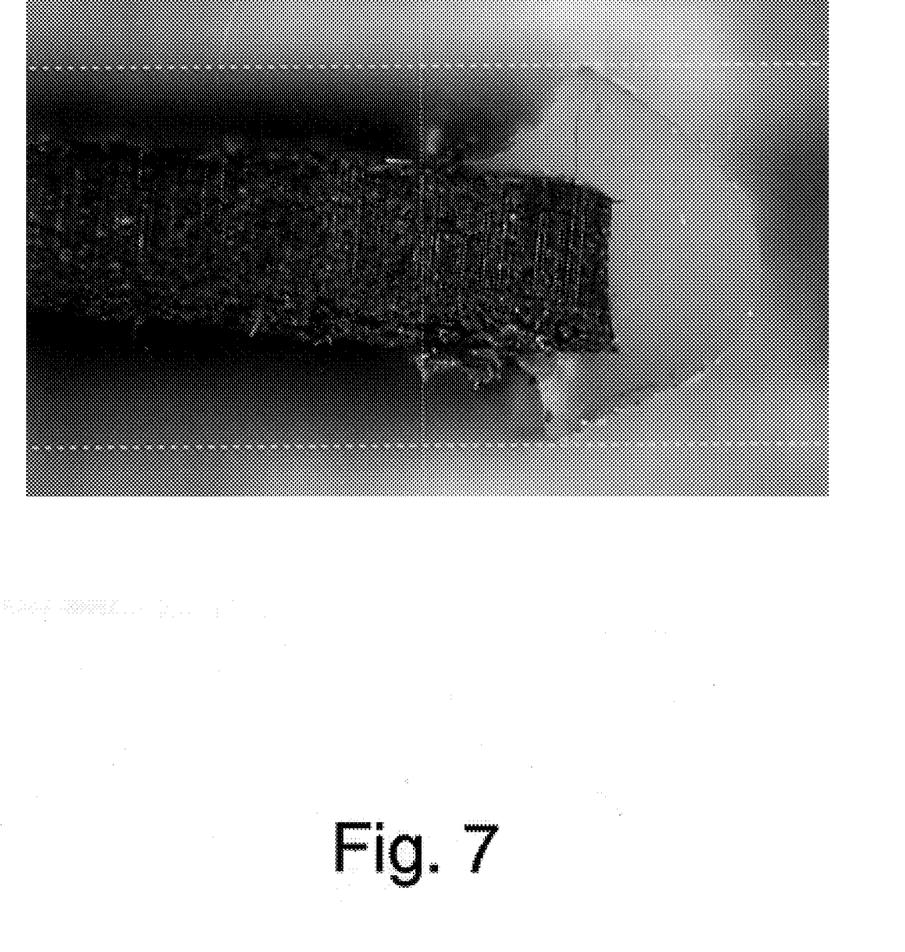
Figure 8:
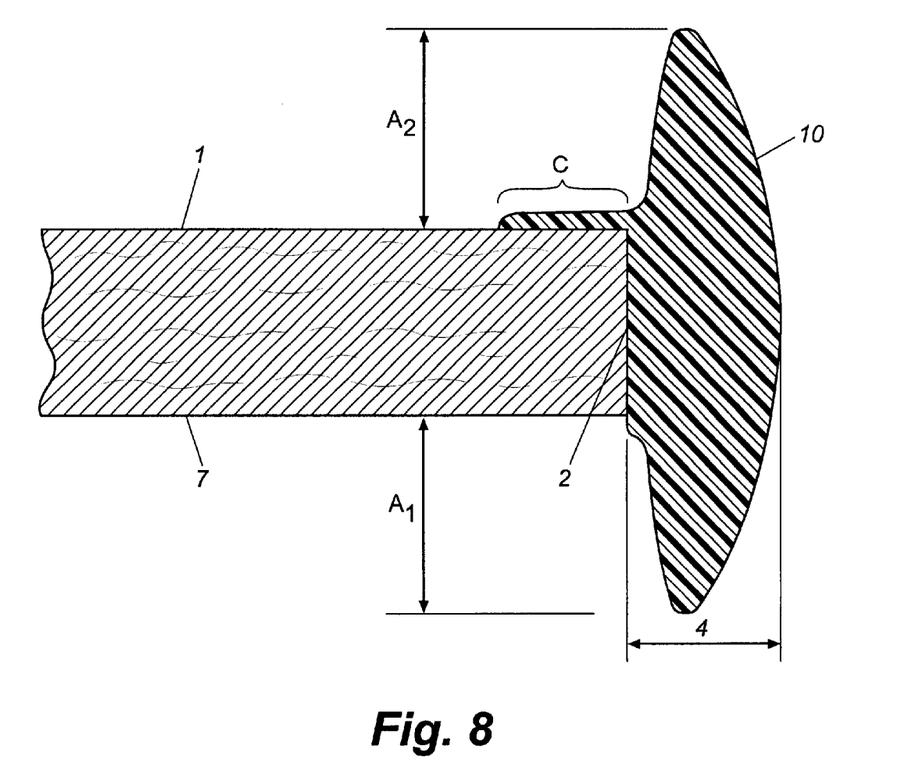

The edge coatings of the present invention have two basic structures: 1) one where the lip or extended coating barrier is partially supported by the gasket face (as it is in FIGS. 3, 6, and 7), and 2) one where the coating merely extends past the corner between the edge and the face (as in FIGS. 1, 2, 4, and 5) where the coating is not resting on or supported by the face.

The lip of the coating (protruding length A) must extend past at least one corner of the edge in an amount effective to form a barrier against the passage of fluids onto the face of the gasket. The distance that protruding length A must extend past the barrier will depend on the structure of the coating. When the lip of the coating is partially on the face of the gasket (as in FIGS. 3, 6 and 7), the minimum length of thickness length B, however, should not be less than about 2 mils, and protruding length A must be at least about 3 mils, and preferably A is at least about 10 mils. Suitably, protruding length A is in the range of from about 3 to about 150 mils, and preferably it is in the range of from about 10 to about 100 mils.

When the lip of the coating does not rest on the face, in order to obtain a gasket which can give a perfect seal across this coated edge the protruding length A must be at least about 4 mils, but the minimum length of thickness length B, however must be least about 3 mils, and the ratio of protruding length A to thickness length B being at least about 0.8 and preferably is at least about 2 mils. Preferably protruding length A is at least about 5 mils long and more preferably is at least about 10 mils long. Suitably, protruding length A is in the range of from about 4 to about 150 mils, and preferably it is in the range of from about 10 to about 125 mils.

When the coating is supported in part by the gasket face, the ratio of the protruding length A (distance 4) to the thickness B (distance 3) can be as low as about 0.6 (a minimum of 0.6). Suitably, the ratio can be in the range of from about 0.6 to about 10. However, when the extended coating does not partially rest on the gasket face, there is no gasket base for the coating, the ratio must be greater to obtain a complete seal. With such a coating, the ratio should be a minimum of about 0.8 or more and preferably it is at least about 2 or more. Suitably, the ratio should be in the range of from about 0.8 to about 20. When the ratio gets too high the barrier against fluids can fail by the laying down or the folding over of the extended coating barrier. Thus, the maximum ratio is preferably about 9.

When the extended coating barrier extends onto the face of the gasket then thickness length B (distance 3) can be from about 2 to about 50 mils and preferably it is from about 10 to about 40 mils long. In such a case the distance C that the coating extends onto the gasket face can be a minimum of about 1 mil, and preferably a minimum of about 5 mils; acceptably it is in the range of from about 1 to about 250 mils long. When the extended coating does not extend onto the face of the gasket then thickness length B can be in the range of from about 3 to about 50 mils long, and preferably it is from about 10 to about 40 mils long.

The edge coatings of the present invention are required to be within a specific ratio range of: protruding length A/thickness length B in order to provide better barriers for sealing against fluid leaks. (In FIGS. 1 and 2 this is shown to be distance 3 over distance 4.)

The edge coatings of the present invention are used on the vertical edges of soft gasket sheet materials. Such soft gasket sheet materials are porous and compressible. The edge coatings are put onto the edge or edges as needed to seal off the gasket against the passage of fluids both into the gasket sheet and across the edge onto the face of the gasket. Preferably, an entire edge is coated, although it is not necessary if an adequate seal is provided by coating merely a portion of the edge; for example, if bolt areas are near an aperture's edge the coating could be optional, and thus omitted, near the bolt.

Edge coatings such as these have been previously described in U.S. patent application Ser. Nos. 920,662 and 920,663. These applications, however, fail to teach that the coatings could be improved by increasing the thickness of the coatings in distance 4 (note FIGS. 1 and 2).

A completely coated gasket can take advantage of the sealing ability provided by the wide-edge edge coatings of the instant invention, although in some embodiments, to preserve compression failure resistance, the total amount of coating covering the gasket faces is preferably limited to cover only a portion of the gasket, the rest of the gasket being left uncoated. Preferably, to preserve compression failure resistance, a coating will cover up to about 50% of the gasket, and even more preferably, it is limited to cover a maximum of about 30% of the gasket.

Soft gasket materials are preferred for use with the wide edge-coating of the present invention. Many types of soft gasket materials comprise fiber and a binder; filler is preferably added. Such soft gasket materials are porous and compressible. The cut gasket edges, being porous are ideal for edge coating since this will help to seal the flow of fluids from the gasket by either penetrating or at least closing off the pores.

In most cases a face and the corner between the edge and the face will be in one plane (which goes through both). In some cases, however, by using pressure, a facial area can be forced into a different plane than the rest of the face. When this is done to the gasket at a location abutting an aperture, the corner between the face and the edge may become rounded and it may be more difficult to detect the location of the corner or the facial plane which goes through the corner. In such cases the corner which the coating should protrude past can be located by noting the point where the cut portion of the edge ends. This is the point of the corner which the coating should protrude past. The cut portion of the edge typically contains more pores than the surface of either gasket face and is also distinctive in appearance by showing a cross-section of the materials inside the gasket. Protruding length A would then be measured from the corner, or from the corner plane that goes through the corner.

Gaskets with the sealing edge coatings of the present invention successfully give an excellent to a total seal. Flange pressures can be used which are down to 25 PSI, although since it is easier to get an excellent to total seal higher flange pressures, it is preferred to use flange pressures of at least about 300 PSI or more. A total seal is found where the coating will completely prevent fluids from leaking past the aperture, across the face of the gasket and also through the gasket sheet.

The coating can be put on in any film-forming manner such as, for example, dipping, melting or painting the exposed edge while protecting any gasket portions not to be coated.

In some embodiments a coating is put on an aperture edge by placing a plurality of gasket sheets together so that a cavity is formed from the apertures of the plurality of gasket sheets, and then contacting the edges of the aperture on each gasket sheet with a coating material so that the edges become coated in an amount effective to achieve a substantial sealing of the gasket along the edge of the aperture where the edge is coated. Separate non-gasket sheets (spacers) having the same configuration as the gasket can be placed between the individual gasket sheets so that the coating can form and extend past the corner of the gasket forming protruding length A (distance 3).

In a preferred method, the coating used deforms or stretches while it is wet or before it becomes completely solid. Then, when the gaskets are separated before the coating on the edge becomes solid, the coating is pulled and stretches so that the protruding length A will form. One coating which is particularly good for this is an acrylic latex polymer.

Preferably, when the aperture edges are coated the gasket sheets have at least one other spacer sheet in between the two gasket sheets. Such other sheets in between the gasket sheets are "spacers" to separate the gaskets from each other. These spacers allow a separation between each gasket sheet to permit the protruding length A to form. The spacer sheets will also have apertures, but the apertures can be wider, smaller, or the same size as the apertures of the gaskets. When the spacer has a wider aperture than the gasket, a portion of the gasket sheet face is exposed and the coating material can contact and coat the face where it is exposed around the aperture. In such a case, where the one or both faces is exposed in an amount effective to permit the coating to contact the exposed face, then a protruding length is formed which rests in part on the gasket face. Preferably, the gasket face around the edge is exposed to the coating in an amount of at least about 5 mils; more preferably the gasket is exposed to the coating at an amount of at least about 8 mils.

Any vertical edge between the opposed faces of a gasket sheet material can be given a coating, including the edge which forms the outer perimeter of the gasket. The coating can be organic, inorganic, or inorganic/organic hybrid polymers as well as filled polymers. When the vertical edge is one which encounters fluids during use, however, a polymer coating is particularly useful and preferred. Suitably the polymer coating materials are coatings selected from the group consisting of acrylic, acrylonitrile, polyvinylidene chloride, fluorosilicone, polyurethane, acrylonitrile butadiene rubber (NBR), fluoro polymers, hydrogenated NBR, silicone rubber coatings (both UV curable, heat curable, and room temperature curable), styrene butadiene polymer, fluoroelastomer polymer, fluorosilicone polymer, acrylic-acrylonitrile polymer, carboxylated acrylonitrile polymer, chloroprene rubber polymer, ethylene propylene rubber polymer, ethylene/vinyl acetate, epoxy, and mixtures thereof. Any latex can be used. Also suitable are polymer powders which are heated to melt them onto the surface of the gasket and form a coating on the gasket edge. In fact, any powder which can be fused can be used to seal and coat the gasket.

The present invention will be better understood from the Examples that follow. These Examples are intended to illustrate the invention and not to limit it. All parts and percentages are by weight unless otherwise indicated.

EXAMPLES

Identical annular gaskets were cut from a cellulose based paper gasket sheet material. Each gasket was a circle and had the following measurements: ring inner diameter 2.5 inches (from one side of the aperture to the other) ring outer diameter 3.75 inches, thickness 31 mils. The gaskets all had the inner vertical edge of the aperture coated with an acrylic latex for the gasket samples. The thickness length B (indicated as the distance of (4) in FIGS. 1 and 2) and the protruding length A (indicated as the distance of (3) in FIGS. 1 and 2) are indicated as "length B" and "length A" for each gasket in each of the Examples.

Also given is result of the EMALT seal test showing the seal quality and effectiveness. The EMALT seal test indicates the sealing ability of the gasket tested. For the EMALT test, the gasket samples were put into a cylinder which could be pressurized with nitrogen. For these tests the flange pressure was at 300 PSI, and the nitrogen pressure in the cylinder was brought up to 14 pounds per square inch (PSI), and the number of minutes that elapsed while the pressure decayed to 13 PSI was measured. The longer it takes for the pressure to drop the better the seal. If the pressure failed to drop at all in the cylinder then the nitrogen was not leaking out past the gasket, and the seal was recorded as a "total seal" in less than perfect seals the psi drop in one minute is given. The test was done on a smooth flange, measuring 18 Ra (Ra is the average roughness value and this is measured in micro-inches; MS indicates micro-inches).

In Examples 1–11 the EMALT results are total seal. In Examples 12–18 the seal is indicated as a psi/min leakage rate.

Examples 1–9

In the coating of the following Examples the protruding lip (length A) was resting partly on the gasket face. A "total seal" means that there was no detectable pressure drop in the first 10 minutes. The unit of length is in mils.

| Ex. No. | Length A | Length B | A:B | Seal Level | Length C |
|---|---|---|---|---|---|
| 1 | 27 | 26 | 1.04 | Total Seal | 0 |
| 2 | 49 | 33 | 1.485 | Total Seal | 2–10 |
| 3 | 49 | 26 | 1.885 | Total Seal | 20 |
| 4 | 39 | 28 | 1.393 | Total Seal | 20 |
| 5 | 19 | 10 | 1.9 | Total Seal | 110 |
| 6 | 16 | 7 | 2.286 | Total Seal | 90 |
| 7 | 9 | 10 | 0.9 | Total Seal | 0 |
| 8 | 31 | 24 | 1.29 | Total Seal | 200 |
| 9 | 18.45 | 2.32 | 7.95 | Total Seal | 200 |

Examples 10–11

In the coating of the following Examples the protruding lip (length A) was resting partly on the gasket face.

For length A the gaskets of these Examples has a different value on each side of the gasket. The length of A1 and A2 is indicated. The units of length is in mils.

| Ex. No. | Length A1 | Length A2 | Length B | A:B | Seal Level |
|---|---|---|---|---|---|
| 10 | 30.4 | 19.9 | 26.5 | .928 | Total Seal |
| 11 | 24.9 | 16.9 | 26.6 | .64 | Total Seal |

Examples 12–18

Figure 4:
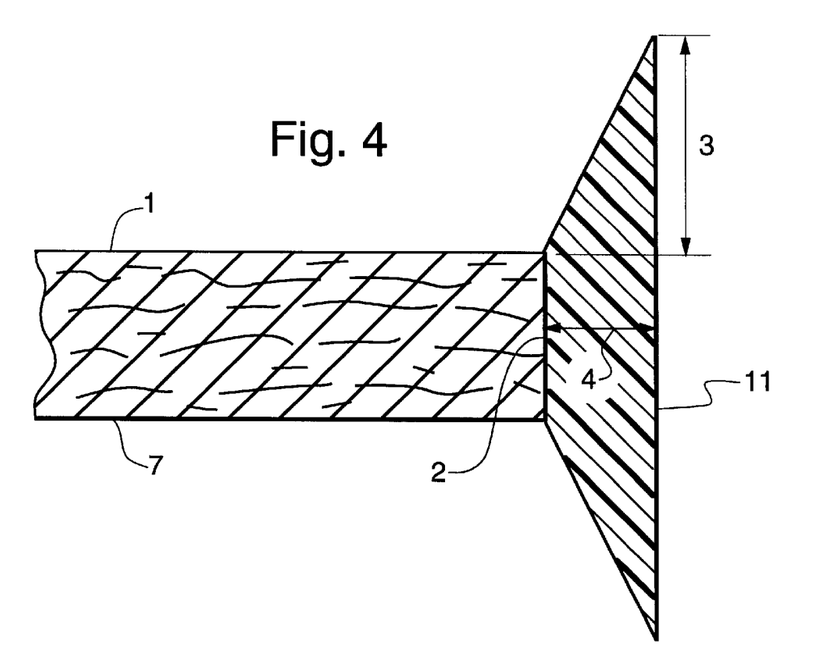
FIG. 4 shows a gasket sheet having edge (2) and opposed faces (1 and 7). The gasket sheet edge (2) has a coating (11) which is an edge seal. The edge seal coating extends beyond the plane of each face in a perpendicular direction. The coating extends a distance (3) which is protruding length A. The thickness of the coating at the middle of the edge is indicated by distance (4) (thickness length B).
Figure 5:
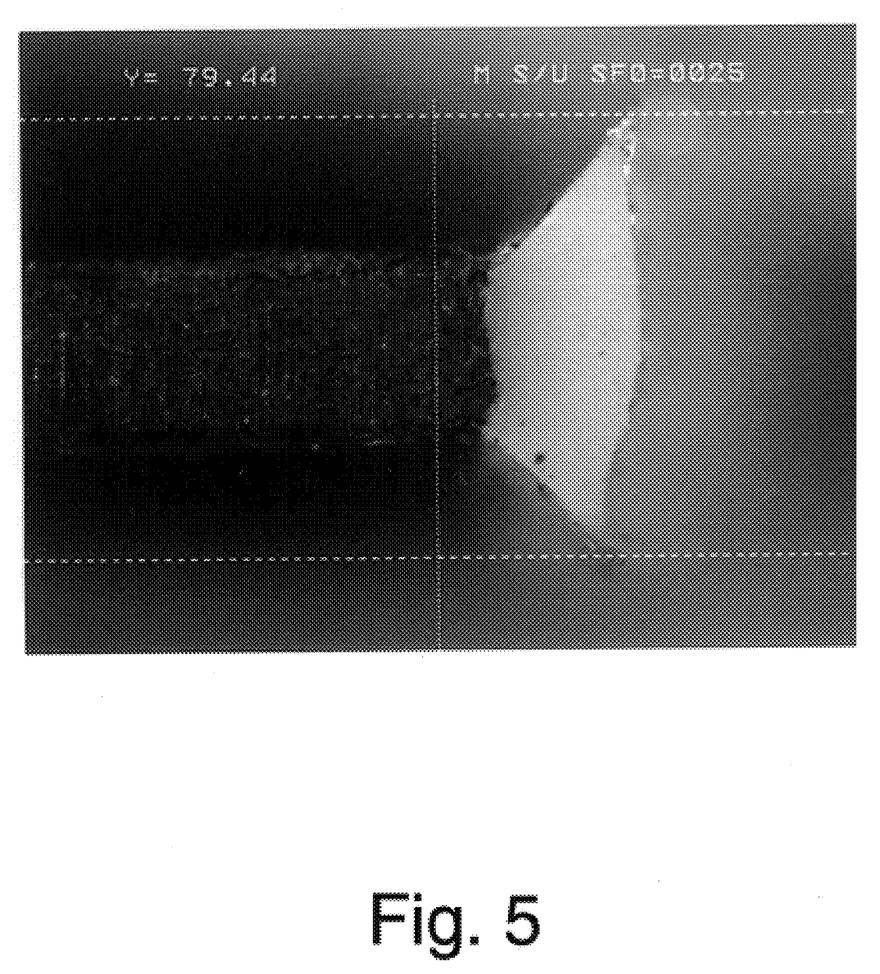

In the coating of the following Examples the protruding lip (length A) was the type indicated by FIG. 4. The seal level is indicated by the psi/min drop rating.

| Ex. No. | Length A | Length B | A:B | Seal Level |
|---|---|---|---|---|
| 12 | 9 | 19 | 0.48 | .33 |
| 13 | 24 | 28 | 0.86 | Total Seal |
| 14 | 16.8 | 17 | 0.99 | .18 |
| 15 | 19.5 | 20 | 0.98 | .0044 |
| 16 | 12.5 | 20 | 0.63 | .63 |
| 17 | 22 | 23 | 0.96 | .011 |
| 18 | 49.5 | 45 | 1.10 | Total Seal |

We claim:

1. A soft gasket material comprising:
   a sheet material having two opposed faces, and an edge substantially perpendicular to the two faces, the edge having an edge length with a center point which is equally distant from each face, wherein further the edge has a coating thereon, said coating having a surface which is a minimum distance away from the center point of the edge length, said distance being thickness length B, said coating further, in a direction parallel to the edge, being wider than the edge length to form a distance of an extended coating, said distance being a protruding length A, said protruding length A being the distance that the coating extends in a perpendicular direction beyond at least one of the opposed faces, further providing that;
   a) where the coating extends beyond at least one of the opposed faces and also overlaps onto at least one of the opposed faces a distance C, the thickness length B is at least about 2 mils and the ratio of the protruding length A to the thickness length B is at least about 0.6; or
   b) where the coating extends beyond at least one of the opposed faces but does not overlap onto at least one of the opposed faces, the thickness length B is at least about 3 mils and the ratio of the protruding length A to the thickness length B is at least about 0.8.

2. The soft gasket material of claim 1 wherein the coating on the edge extends beyond at least one of the opposed faces in a direction perpendicular to the opposed face but the coating does not overlap onto the opposed face, further providing that protruding length A is in the range of from about 5 to about 150 mils long.

3. The soft gasket material of claim 1 wherein the coating on the edge extends beyond at least one of the opposed faces in a direction perpendicular to the opposed face and the coating overlaps onto the opposed face a distance C, further providing that protruding length A is in the range of from about 5 to about 150 mils long.

4. The soft gasket material of claim 3 wherein distance C is at least about 1 mils long.

5. The soft gasket material of claim 3 wherein distance C is at least about 5 mils long.

6. The soft gasket material of claim 1 wherein the coating is a polymer material selected from the group consisting of acrylic, acrylonitrile, polyvinylidene chloride, fluorosilicone, polyurethane, acrylonitrile butadiene rubber, fluoro polymers, hydrogenated NBR, UV curable silicone rubber coatings, room temperature curable silicone rubber, styrene butadiene polymer, fluoroelastomer polymer, fluorosilicone polymer, acrylic-acrylonitrile polymer, carboxylated acrylonitrile polymer, chloroprene rubber polymer, ethylene propylene rubber polymer, ethylene/vinyl acetate, epoxy, and mixtures thereof.

7. A soft gasket material comprising:
a sheet material having two opposed faces, and an edge substantially perpendicular to the two faces, the edge having an edge length with a center point which is equally distant from each face, wherein further the edge has a coating thereon, said coating having a surface which is a minimum distance away from the center point of the edge length, said distance being thickness length B, said coating further, in a direction parallel to the edge, being wider than the edge length so that an extended coating is formed which extends past each face in a direction perpendicular to that face wherein the extended coating extends past the face a distance which is protruding length $A_1$, and further where the extended coating at the other face extends past that face a distance which is protruding length $A_2$, said protruding lengths $A_1$ and $A_2$ being the distance that the edge coating extends in a perpendicular direction beyond one of the opposed faces, further providing that;
a) where the coating extends beyond at least one of the opposed faces and also overlaps onto at least one of said faces a distance C, then at least one of the protruding lengths $A_1$ and $A_2$ is at least about 3 mils and the ratio of the protruding length $A_1$ or $A_2$ to the thickness length B is at least about 0.6;or
b) where the coating extends beyond at least one of the opposed faces and does not overlap onto at least one of said faces, then at least one of the protruding lengths $A_1$ and $A_2$ is at least about 4 mils and the ratio of the protruding lengths $A_1$ or $A_2$ to the thickness length B is at least about 0.8.

8. The soft gasket material of claim 7 wherein the coating on the edge extends beyond each of the opposed faces in a direction perpendicular to the faces and the coating does not overlap onto the faces, further providing that at least one of the protruding lengths, $A_1$ and $A_2$ is in the range of from about 5 to about 150 mils long.

9. The soft gasket material of claim 7 wherein the coating on the edge extends beyond each of the opposed faces in a direction perpendicular to the opposed faces and the coating overlaps onto each of the faces face a distance C so that each of the protruding lengths $A_1$ and $A_2$ is in the range of from about 5 to about 150 mils long.

10. The soft gasket material of claim 7 wherein the coating on the edge extends beyond each of the opposed faces in a direction perpendicular to the opposed faces and wherein the extended coating on the edge does not overlap onto one face of the sheet material and does overlap onto the opposite face a distance C, further providing that protruding lengths $A_1$ and $A_2$ are in the range of from about 5 to about 150 mils long.

11. The soft gasket material of claim 10 wherein distance C is at least about 1 mils long.

12. The soft gasket material of claim 10 wherein distance C is at least about 5 mils long.

13. The soft gasket material of claim 7 wherein the coating is a polymer material selected from the group consisting of acrylic, acrylonitrile, polyvinylidene chloride, fluorosilicone, polyurethane, acrylonitrile butadiene rubber, fluoro polymers, hydrogenated NBR, UV curable silicone rubber coatings, room temperature curable silicone rubber coatings, styrene butadiene polymer, fluoroelastomer polymer, fluorosilicone polymer, acrylic-acrylonitrile polymer, carboxylated acrylonitrile polymer, chloroprene rubber polymer, ethylene propylene rubber polymer, ethylene/vinyl acetate, epoxy, and mixtures thereof.

* * * * *